(12) United States Patent
Smith et al.

(10) Patent No.: US 9,981,521 B2
(45) Date of Patent: May 29, 2018

(54) ARTICULATING MULTI-AXLE ASSEMBLY

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 120 days.

(21) Appl. No.: 15/045,983

(22) Filed: Feb. 17, 2016

(65) Prior Publication Data

US 2017/0232811 A1    Aug. 17, 2017

(51) Int. Cl.
| | | |
|---|---|---|
| *B60G 9/04* | (2006.01) | |
| *B60G 9/00* | (2006.01) | |
| *B60G 15/08* | (2006.01) | |
| *B60G 17/00* | (2006.01) | |
| *B60B 35/00* | (2006.01) | |
| *B60B 35/04* | (2006.01) | |

(52) U.S. Cl.
CPC .............. *B60G 9/04* (2013.01); *B60B 35/006* (2013.01); *B60B 35/04* (2013.01); *B60G 9/00* (2013.01); *B60G 15/08* (2013.01); *B60G 17/00* (2013.01)

(58) Field of Classification Search
CPC . B60G 9/00; B60G 9/04; B60G 35/04; B60G 35/006
See application file for complete search history.

(56) References Cited

U.S. PATENT DOCUMENTS 3,512,597 A    5/1970   Baron
4,058,065 A *  11/1977  Seifert ................ B60F 1/02
                                                    104/306

(Continued)

OTHER PUBLICATIONS www.chinaheavylift.com/wp-content/uploads/2013/06/compensation1.jpg; Jan. 7, 2016.

(Continued)

*Primary Examiner* — James A English
(74) *Attorney, Agent, or Firm* — Schwabe Williamson & Wyatt

(57) ABSTRACT

An axle assembly for transporting a load bearing frame includes a first axle operably coupled to an axle mount of the load bearing frame by a first articulation structure, and a second axle spaced a distance from the first axle and operably coupled to the axle mount by a second articulation structure. The first articulation structure is rotationally coupled to the axle mount by a first articulation connection, and the second articulation structure is rotationally coupled to the axle mount by a second articulation connection. A suspension system is operably coupled to both the first articulation structure and the second articulation structure. In a first mode of operation, the suspension system forms a substantially rigid connection between the first articulation structure and the second articulation structure. In response to an upward articulation of the first articulation structure towards the load bearing frame, the substantially rigid connection causes the second articulation structure to articulate down and away from the load bearing frame. In a second mode of operation, the suspension system articulates both the first articulation structure and the second articulation structure towards the load bearing frame.

20 Claims, 10 Drawing Sheets

(56) References Cited

U.S. PATENT DOCUMENTS

| | | | |
|---|---|---|---|
| 4,252,204 A | 2/1981 | Bishop | |
| 8,480,106 B1* | 7/2013 | Cohen | B60G 17/005 |
| | | | 180/256 |
| 8,646,976 B2 | 2/2014 | Stoik et al. | |
| 2001/0035624 A1* | 11/2001 | Hickling | B60G 9/00 |
| | | | 280/124.169 |
| 2005/0263986 A1* | 12/2005 | Miller | B60G 5/047 |
| | | | 280/683 |
| 2016/0250892 A1* | 9/2016 | Saieg | B60G 3/20 |
| | | | 280/86.75 |

OTHER PUBLICATIONS

Haynes Sherman Tank Manual Details; https://haynes.co.uk/microsites/sherman/sherman_book_details.htm; Jan. 6, 2016.
http://www.kimax.com/uploads/images/how_hydraulic.gif; Jan. 7, 2016.

* cited by examiner

ARTICULATING MULTI-AXLE ASSEMBLY

TECHNICAL FIELD

This disclosure generally relates to systems, devices, apparatus, and methods associated with an axle assembly for a load transport system.

BACKGROUND

Moving extremely heavy loads has generally been a complicated task because of the large forces involved in lifting and transporting the heavy loads. In known transport structures, large loads may be transported by disassembling or breaking up the load or the load bearing frame of the transport structure into multiple smaller sections and/or loads. However, this break-down and subsequent reassembly process can be very time consuming, especially when a heavy load is only to be moved a small distance, or needs to be repositioned.

For transport structures configured to move heavy loads that may need periodic repositioning or adjustment, devices commonly referred to as "walking machines" or "walkers" were developed. These machines may be configured to move the heavy loads over small distances in incremental stages. For example, walking machines may be used to move large structures, such as oil rigs, in order to sequentially position them over a number of pre-drilled pipes in an oil field.

Additionally, heavy duty axle assemblies have been developed to transport and/or support heavy loads, for example that may weigh one million pounds or more. The axle assemblies may be attached to a suspension system comprising a substantially vertical hydraulic cylinder that is typically connected directly to the load bearing frame of the transport structure at a position above the axle assembly. While the hydraulic cylinder may be used to adjust the relative position of the axle assembly to the frame, additional frame height and/or clearance may be required to accommodate known suspension systems. The increased height of the frame may additionally result in an increased vertical center of gravity of the load that is supported on the frame, which may affect load stability.

The present invention addresses these and other problems.

SUMMARY

An axle assembly for transporting a load bearing frame is disclosed herein. The axle assembly may comprise a first axle operably coupled to an axle mount of the load bearing frame by a first articulation structure, and a second axle spaced a distance from the first axle and operably coupled to the axle mount by a second articulation structure. The first articulation structure and the second articulation structure may be rotationally coupled to the axle mount by one or more articulation connections. The axle assembly may comprise a suspension system operably coupled to both the first articulation structure and the second articulation structure.

In a first mode of operation, the suspension system may be configured to form a substantially rigid connection between the first articulation structure and the second articulation structure. In response to an upward articulation of the first articulation structure towards the load bearing frame, the substantially rigid connection may be configured to cause the second articulation structure to articulate down and away from the load bearing frame. In a second mode of operation, the suspension system may be configured to articulate both the first articulation structure and the second articulation structure towards the load bearing frame.

A method for transporting a load bearing frame is disclosed herein. The method may comprise placing a first axle in an extended position, and placing a second axle in an extended position. The first axle may be operably coupled to an axle mount of the load bearing frame by a first articulation structure, and the second axle may be spaced apart from the first axle and operably coupled to the axle mount by a second articulation structure. Additionally, the second articulation structure may be operably coupled to the first articulation structure by a suspension system.

The method may comprise forming a substantially rigid connection between the first articulation structure and the second articulation structure when the first axle and the second axle are placed in the extended position. In response to an upward articulation of the first articulation structure towards the load bearing frame, the substantially rigid connection may cause the second articulation structure to articulate down and away from the load bearing frame.

The method may further comprise moving the load bearing frame with the first axle and the second axle placed in the extended position to support the load bearing frame on a transport surface. The load bearing frame may be supported above the transport surface by a frame clearance.

At least a portion of the wheels may be withdrawn into the load bearing frame by articulating the first articulation structure and the second articulation structure to place both the first axle and the second axle in a retracted position. The frame clearance may decrease in response to withdrawing the portion of the wheels. The load bearing frame may be moved with the first axle and the second axle placed in the retracted position.

An apparatus for transporting a load bearing frame is disclosed herein. The apparatus may comprise means for coupling a first axle to an axle mount of the load bearing frame, and means for coupling a second axle to the axle mount. Both the first axle and the second axle may be placed in an extended position relative to the load bearing frame. With the first and second axles placed in the extended position, one or more wheels associated with the first axle and the second axle may be configured to support the load bearing frame on a transport surface. The load bearing frame may be supported above the transport surface by a frame clearance.

Additionally, the apparatus may comprise means for controlling an amount of articulation of the means for coupling. In a first mode of operation, in response to an upward articulation of the first axle towards the load bearing frame, the second axle may be configured to articulate down and away from the load bearing frame. In a second mode of operation, both the first axle and the second axle may be configured to articulate towards the load bearing frame.

DETAILED DESCRIPTION

A support structure for carrying a heavy load, such as an oil rig, may comprise one or more load transport apparatus or systems that are used for transporting the support structure. Such loads may be as heavy as several thousand tons and may be sequentially positioned very precisely over spaced-apart well bores, for example. The load transport apparatuses or systems may include one or more axle assemblies.

Figure 1:
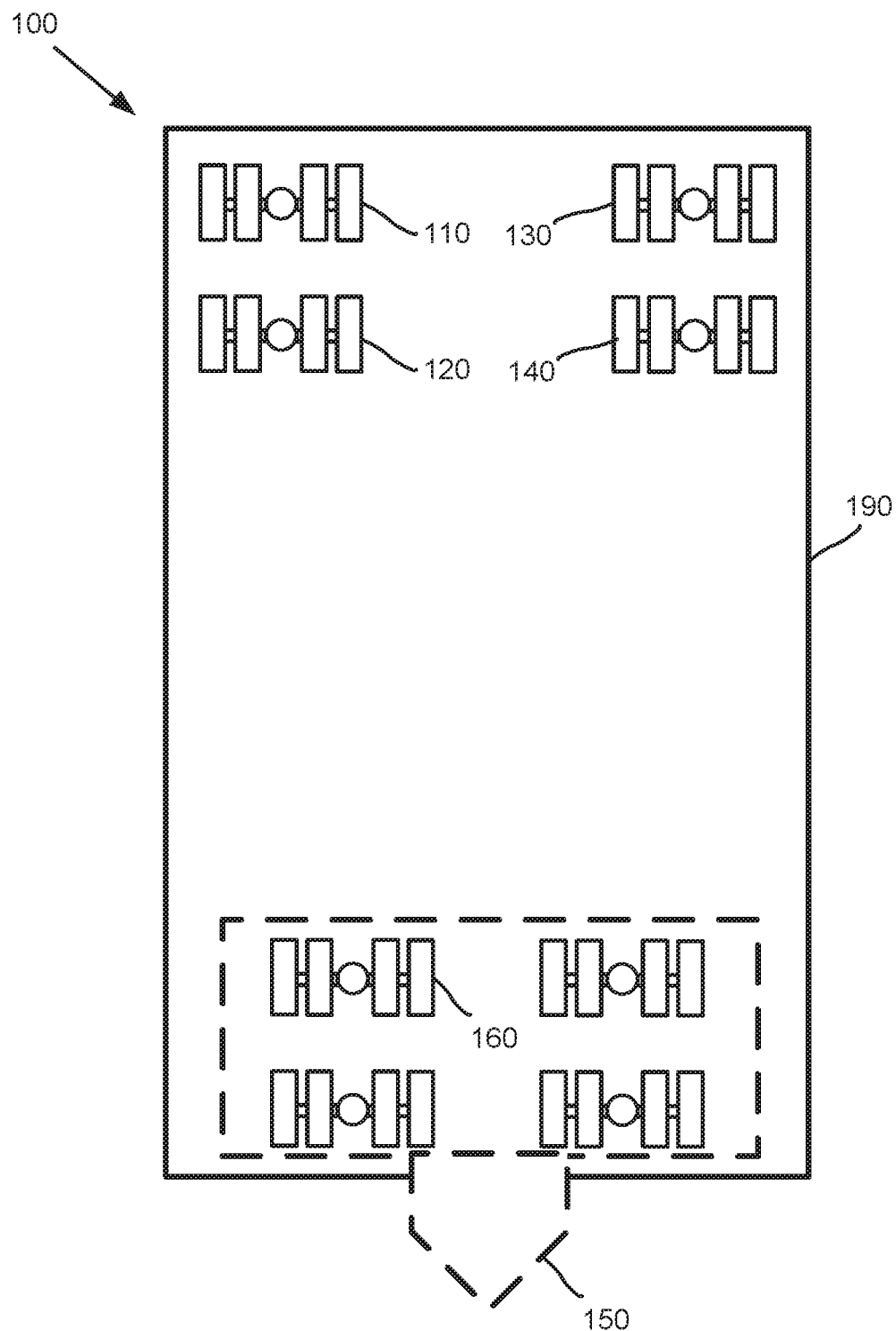
FIG. 1 illustrates an example load transport system.

FIG. 1 illustrates a planar view of an example transportable mounting structure 100. The mounting structure 100 may comprise a platform 190, such as a heavy duty trailer. A plurality of load transport apparatus, such as a first axle assembly 110, a second axle assembly 120, a third axle assembly 130, and a fourth axle assembly 140 may be connected to the platform 190 at one or both ends. For example, the first axle assembly 110 may be connected at a front end of platform 190 and another load axle assembly 160 may be connected at a rear end of platform 190.

Additional axle assemblies and/or load transport structures may be connected at the corresponding left and right sides of either end of platform 190. Depending on the size of mounting structure 100 and/or the weight of the load being transported on platform 190, additional axle assemblies and/or load transport devices may be connected at one or more positions along the length and/or width of mounting structure 100.

First axle assembly 110 may be attached to platform 190 as a stand-alone assembly. In other examples, first axle assembly 110 and second axle assembly 120 may be attached to platform 190 as a multi-axis assembly. Axle assembly 160 may be connected to platform 190 via a trailer assembly 150 (shown in dashed lines) comprising a plurality of load transport apparatus. Trailer assembly 150 may be configured to mount to a tow vehicle (not shown) and in some examples, the entire trailer assembly 150 may be configured to pivot or turn with respect to platform 190 during transport of and/or maneuvering mounting structure 100.

Figure 2:
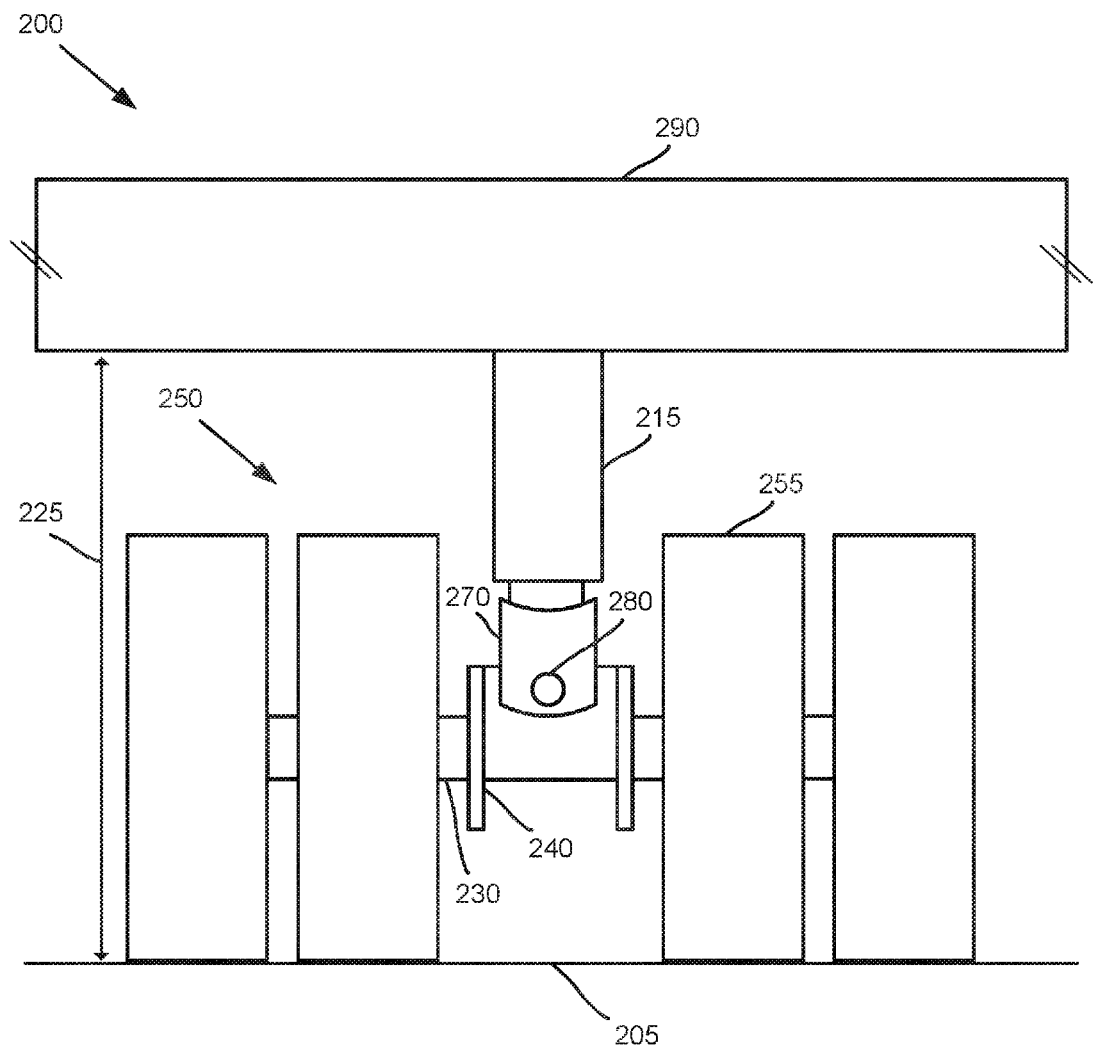
FIG. 2 illustrates a front view of an example load transport apparatus comprising an axle assembly.

FIG. 2 illustrates a front view of an example load transport apparatus 200 comprising an axle assembly 250. A lift apparatus 215 may be coupled to a load bearing support structure 290. Axle assembly 250 may be operably coupled to lift apparatus 215 by a coupling apparatus 270.

Lift apparatus 215 may additionally be operably coupled to axle assembly 250 via coupling apparatus 270. Axle assembly 250 may comprise an axle 230 that passes through and/or is rotationally coupled to an axle mount 240. Four wheels 255 are shown as being connected to axle 230, although more or fewer wheels associated with axle assembly 250 are contemplated herein.

Lift apparatus 215 may be configured to raise and/or lower support structure 290 some distance 225 relative to the ground 205 or some other type of transport surface. The distance 225 may correspond to a frame clearance of support structure 290 relative to the ground 205. Additionally, lift apparatus 215 may be configured to raise and/or lower the axle assembly 250 relative to the ground 205, for example when support structure 290 is supported above the ground 205 by one or more jacks or support legs.

In some examples, axle assembly 250 may be configured to rotate or articulate about an articulation connection 280 of coupling apparatus 270. Articulation connection 280 may provide for the articulation of axle assembly 250 about an axis of rotation which is substantially perpendicular to the axis of rotation of axle 230.

Figure 3:
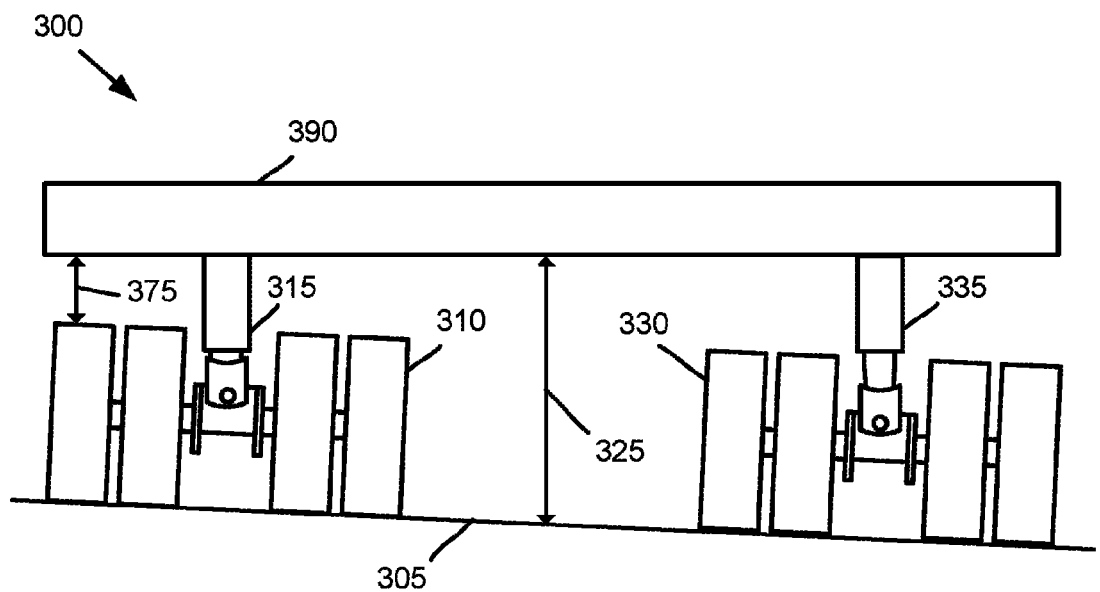
FIG. 3 illustrates a front view of an example load transport apparatus positioned on a laterally inclined support surface.

FIG. 3 illustrates a front view of an example load transport apparatus 300 positioned on a laterally inclined support surface 305. Load transport apparatus 300 may comprise a first axle assembly 310 located on a first side of a support structure 390 and a second axle assembly 330 located on a second side of the support structure 390 of load transport apparatus 300, similar to axle assemblies 110, 130 of FIG. 1.

First axle assembly 310 may be configured similarly as axle assembly 250 of FIG. 2, and may be pivotally attached to support structure 390 by a first lift apparatus 315. First axle assembly 310 may be configured to pivot in order to maintain contact between a plurality of tires and/or wheels and the inclined surface 305, while the support structure 390 remains gravitationally level and/or maintained at a fixed angle of inclination. Maintaining the fixed angle of inclination of support structure 390 may operate to stabilize a load that is placed on support structure 390 during transport and/or during a drilling operation. Additionally, second axle assembly 330 may be pivotally attached to support structure 390 by a second lift apparatus 335.

In order to maintain the support structure 390 at a level or fixed angle of inclination with respect to the inclined surface 305, the second lift apparatus 335 may be configured to apply a hydraulic force or otherwise extend second axle assembly 330 to an extended position. On the other hand, first lift apparatus 315 may be configured to position first axle assembly 310 in a retracted position.

The retracted position associated with the first axle assembly 310 may be configured to provide a wheel clearance 375 between the outermost tire of first axle assembly 310 and the support structure 390. In some examples, first axle assembly 310 may be configured to provide sufficient wheel clearance 375 to accommodate the maximum amount of rotation or articulation of first axle assembly 310 about the articulation connection associated with first lift apparatus 315. The maximum amount of articulation associated with first axle assembly 310 may correspond to the maximum rated angle of the inclined surface 305 that load transport apparatus 300 is configured to traverse.

The frame clearance 325 of the support structure 390 with respect to the transport surface may be determined, at least in part, from the amount of wheel clearance 375 associated with first axle assembly 310, whether the transport surface is inclined, as shown in FIG. 3, or generally level, as shown in FIG. 2. The angle of slope associated with inclined surface 305 may also determine the frame clearance 325, such that the frame clearance 325 may vary significantly between the left and right sides of the support structure 390.

Figure 4:
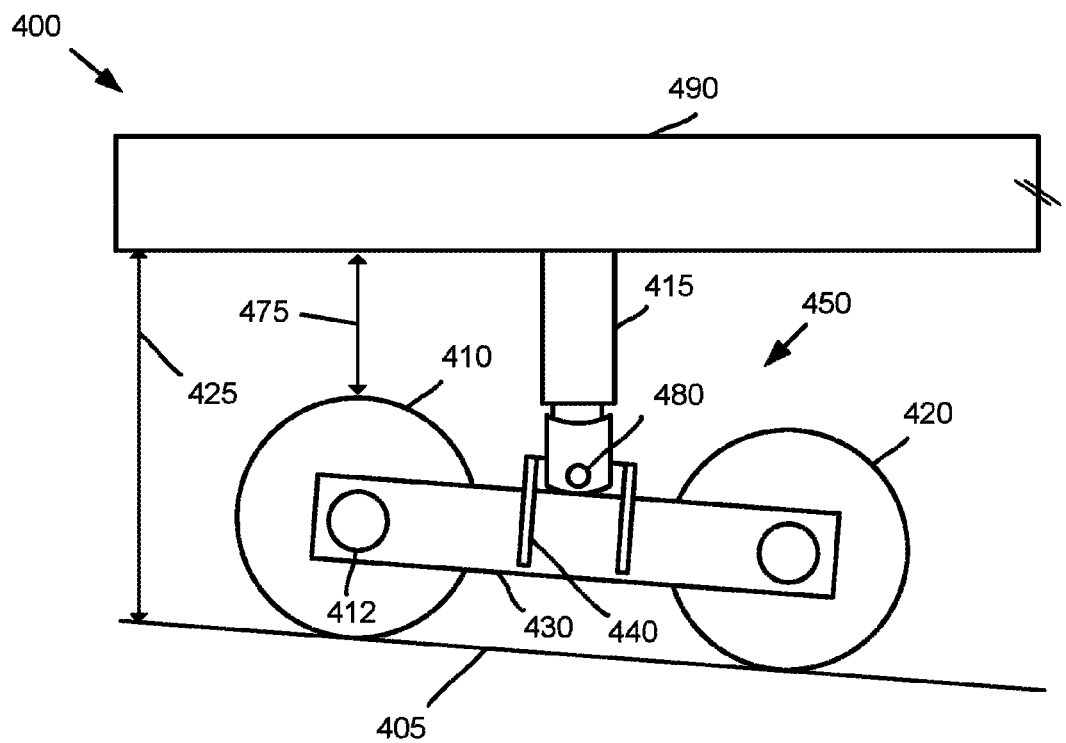
FIG. 4 illustrates a side view of an example load transport apparatus positioned on a longitudinally inclined support surface.

FIG. 4 illustrates a side view of an example load transport apparatus 400 positioned on a longitudinally inclined support surface 405. Load transport apparatus 400 may comprise a multi-axle assembly 450 comprising a first axle assembly 410 and a second axle assembly 420. In some examples, first axle assembly 410 and second axle assembly 420 may be located similarly on a support structure 490 as first axle assembly 110 and second axle assembly 120, respectively, on platform 190 of FIG. 1.

Multi-axle assembly 450 may be operably coupled to a support structure 490 via a lift apparatus 415. Multi-axle assembly 450 may comprise an axle beam 430 that is operably coupled to lift apparatus 415 by an axle mount 440. Lift apparatus 415 may be configured to raise and/or lower support structure 490 some distance relative to the surface 405. The distance may correspond to a frame clearance 425 of support structure 490 relative to surface 405. Additionally, lift apparatus 415 may be configured to raise and/or lower the multi-axle assembly 450 relative to surface 405, for example when support structure 490 is supported above surface 405 by one or more jacks or support legs. Multi-axle assembly 450 may be understood as being located in a generally retracted position in FIG. 4.

First axle assembly 410 and second axle assembly 420 may be operably coupled to opposite ends of the axle beam 430. Multi-axle assembly 450 may be configured to rotate or articulate about an articulation connection 480 with lift apparatus 415. Articulation connection 480 may provide for the articulation of multi-axle assembly 450 about an axis of rotation which is substantially parallel to the axis of rotation of the axles and/or wheels associated with one or both of first axle assembly 410 and second axle assembly 420, such as axle 412.

The retracted position associated with multi-axle assembly 450 may be configured to provide a wheel clearance 475 between one or more tires or wheels associated with first axle assembly 410 and the support structure 490 as axle beam 430 rotates about articulation connection 480. A similar wheel clearance may be provided between the wheels associated with second axle assembly 410 and the support structure 490, as axle beam 430 rotates about articulation connection 480, for example in an opposite rotational direction.

Multi-axle assembly 450 may be configured to provide sufficient wheel clearance 475 to accommodate the maximum amount of rotation or articulation of multi-axle assembly 450 about articulation connection 480. The maximum amount of articulation associated with multi-axle assembly 450 may correspond to the maximum rated angle of the inclined surface 405 that load transport apparatus 400 is configured to traverse.

The frame clearance 425 associated with the support structure 490 with respect to the transport surface 405 may be determined, at least in part, from the amount of wheel clearance 475 associated with multi-axle assembly 450, whether the transport surface is inclined, as shown in FIG. 4, or generally level, as shown in FIG. 2. In some examples, frame clearance 425 may be determined, at least in part, from the height of lift apparatus 415 and/or the distance between support structure 490 and articulation connection 480. The angle of slope associated with inclined surface 405 may also determine the frame clearance 425, such that the frame clearance 425 may vary significantly between the front and back ends of the support structure 490 when it is located in a generally horizontal orientation.

Figure 5:
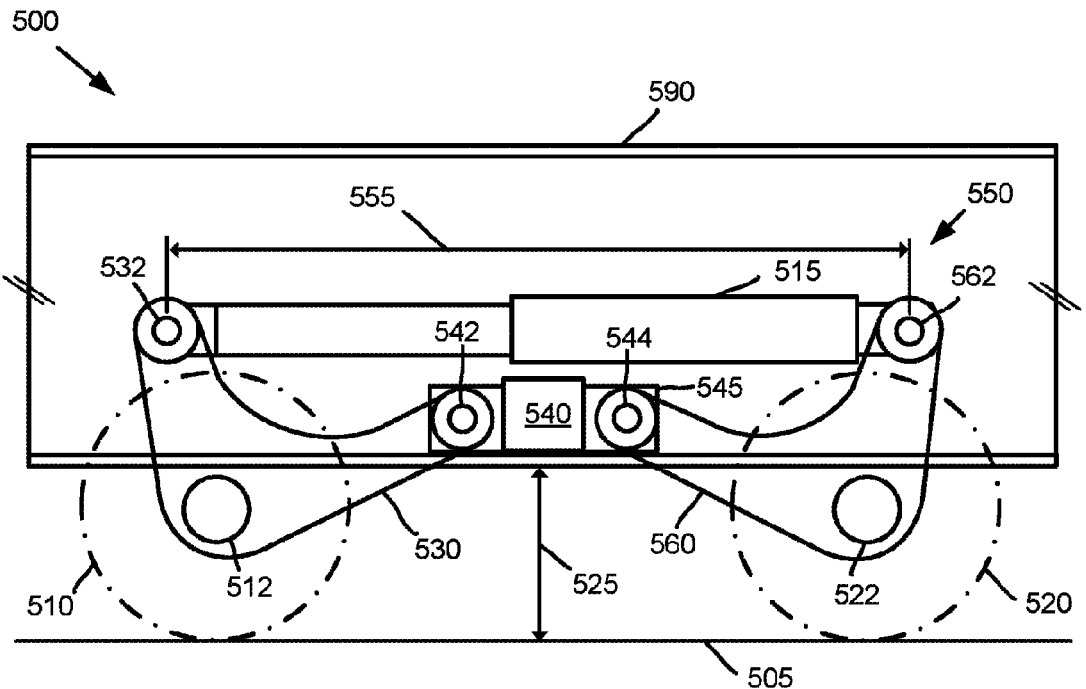
FIG. 5 illustrates an example multi-axle assembly.

FIG. 5 illustrates an example multi-axle assembly 550 for a load transport apparatus 500. The multi-axle assembly 550 may comprise a first axle assembly 510 and a second axle assembly 520. First axle assembly 510 may comprise one or more wheels (shown in dashed lines) mounted on a first axle 512. Similarly, second axle assembly 520 may comprise one or more wheels (shown in dashed lines) mounted on a second axle 522.

Multi-axle assembly 550 may be operably coupled to a support structure 590 of load transport apparatus 500 via an axle mount 540. In some examples, axle mount 540 may be welded or otherwise attached to a structural frame of support structure 590. Axle mount 540 may comprise a first articulation connection 542 and a second articulation connection 544. First articulation connection 542 and second articulation connections 544 may be offset or spaced apart from each other, and may be located on an axle attachment plate 545 of axle mount 540. For example, first and second articulation connections 542, 544 may be located on opposite sides of axle mount 540. Additionally, first and second articulation connections 542, 544 may be located within the structural frame of support structure 590.

A first articulation structure 530 may be configured to operably couple first axle assembly 510 to axle mount 540, so that first axle 512 may articulate about first articulation connection 542. Additionally, a second articulation structure 560 may be configured to operably couple second axle assembly 520 to axle mount 540, so that second axle 522 may articulate about second articulation connection 544. First and second articulation connections 542, 544 may therefore provide two separate pivot points for the first and second axle assemblies 510, 520, respectively, of multi-axle assembly 550. First and second articulation structures 530, 560 may comprise substantially rigid metal plates.

First axle assembly 510 and second axle assembly 520 may be configured to pivot or articulate about first articulation connection 542 and second articulation connection 544, respectively. First and second articulation connections 542, 544 may be configured to provide rotational axes for pivoting and/or articulating first and second axle assemblies 510, 520 which are substantially parallel to the axes of rotation of first and second axles 512, 522.

First articulation structure 530 may be operably coupled to second articulation structure 560 by a suspension system 515. First articulation structure 530 may be rotationally coupled to suspension system 515 at a first connection 532. Similarly, second articulation structure 560 may be rotationally coupled to suspension system 515 at a second connection 562. The first and second connections 532, 562 may be located at either end of suspension system 515.

Suspension system 515 may comprise a hydraulic cylinder, a pneumatic cylinder, a motor-driven push rod, other types of suspension devices and/or lift devices such as those including gears and linkage, or any combination thereof. For example, suspension system 515 may comprise a lift cylinder oriented in a generally horizontal position and housed within the structural frame of support structure 590.

Suspension system 515 may be configured to control the articulation of one or both of first axle assembly 510 and second axle assembly 520 about their respective articulation connections 542, 544. Additionally, suspension system 515 may be configured to maintain and/or control an amount of frame clearance 525 associated with the support structure 590 with respect to a transport surface 505. Multi-axle assembly 550 may be understood as being located in a generally extended position as illustrated in FIG. 5.

Suspension system 515 may be configured to control, vary, or otherwise adjust a distance 555 between first and second connections 532, 562 according to the amount of articulation of one or both of first axle assembly 510 and second axle assembly 520. In some examples, suspension system 515 may be configured to extend and/or retract to vary the distance 555, such as through the actuation of a lift cylinder. Varying the distance 555 between first and second connections 532, 562 may also operate to vary the distance between and/or relative vertical positions of first and second axles 512, 52.2 as one or both of first axle assembly 510 and second axle assembly 520 articulates. The distance between first axle 512 and second axle 522 may vary along a length of the load bearing frame of support structure 590. First articulation connection 542 may be spaced apart from second articulation connection 544 along the length of the load bearing frame.

Suspension system 515 may comprise a hydraulic cylinder rotationally coupled to both first articulation structure 530 and second articulation structure 560, and the hydraulic cylinder may be configured to retract or extend based, at least in part, on the amount of articulation. The hydraulic cylinder may be configured to control the amount of articulation of one or both first articulation structure 530 and second articulation structure 560 while the hydraulic cylinder is in a generally horizontal orientation. The hydraulic cylinder may not be connected to the frame of support structure 590 or any other structure other than first and second articulation structures 530, 560.

In some examples, suspension system 515 may be configured to maintain or fix the distance 555 between first and second connections 532, 562, such that suspension system 515 may form a substantially rigid body in one or more modes of operation. For example, suspension system 515 may comprise a hydraulic cylinder that is locked as a rigid body after multi-axle assembly 550 has been placed in the extended position or in a retracted position.

Figure 6:
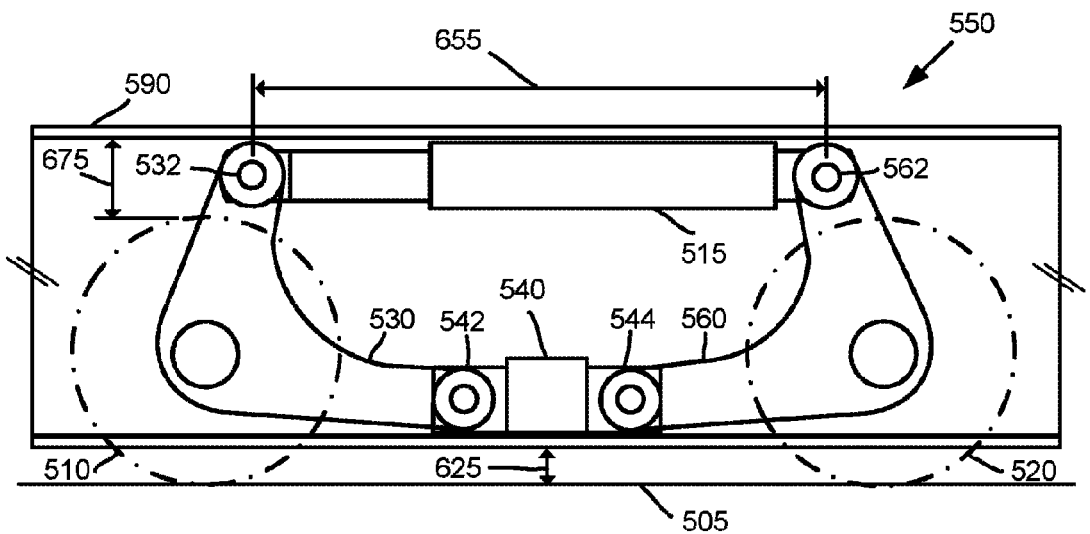
FIG. 6 illustrates the example multi-axle assembly of FIG. 5 in a retracted position.

FIG. 6 illustrates the example multi-axle assembly of FIG. 5 in a retracted position. In the retracted position, first axle assembly 510 and second axle assembly 520 may be substantially withdrawn into the structural frame of support structure 590. In some examples, only a lower portion of the wheels associated with multi-axle assembly 550 may extend below the structural frame to provide a reduced frame clearance 625. In other examples, the wheels may be completely withdrawn into the structural frame such that the support structure 590 may rest directly on the support surface 505 without any frame clearance 625.

The retracted position associated with multi-axle assembly 550 may be configured to provide a wheel clearance 675 between one or more tires or wheels associated with first axle assembly 510 and the support structure 590. A similar wheel clearance may be provided between the wheels associated with second axle assembly 520 and the support structure 590. Multi-axle assembly 550 may be configured to vary the frame clearance 625 according to the amount of wheel clearance 675.

In withdrawing multi-axle assembly 550 to the retracted position, suspension system 515 may be configured to decrease the distance 655 between first and second connections 532, 562 as compared to the example load transport apparatus 500 illustrated in FIG. 5, in which multi-axle assembly 550 is shown in the extended position. In some examples, suspension system 515 may be configured to extend and/or retract to vary the distance 655, which may in turn operate to vary the frame clearance 625 as one or both of first axle assembly 510 and second axle assembly 520 articulate relative to axle mount 540. The distance between first articulation connection 542 and second articulation connection 544, on the other hand, may remain fixed as multi-axle assembly 550 articulates between the retracted position illustrated in FIG. 6 and the extended position illustrated in FIG. 5.

Figure 7:
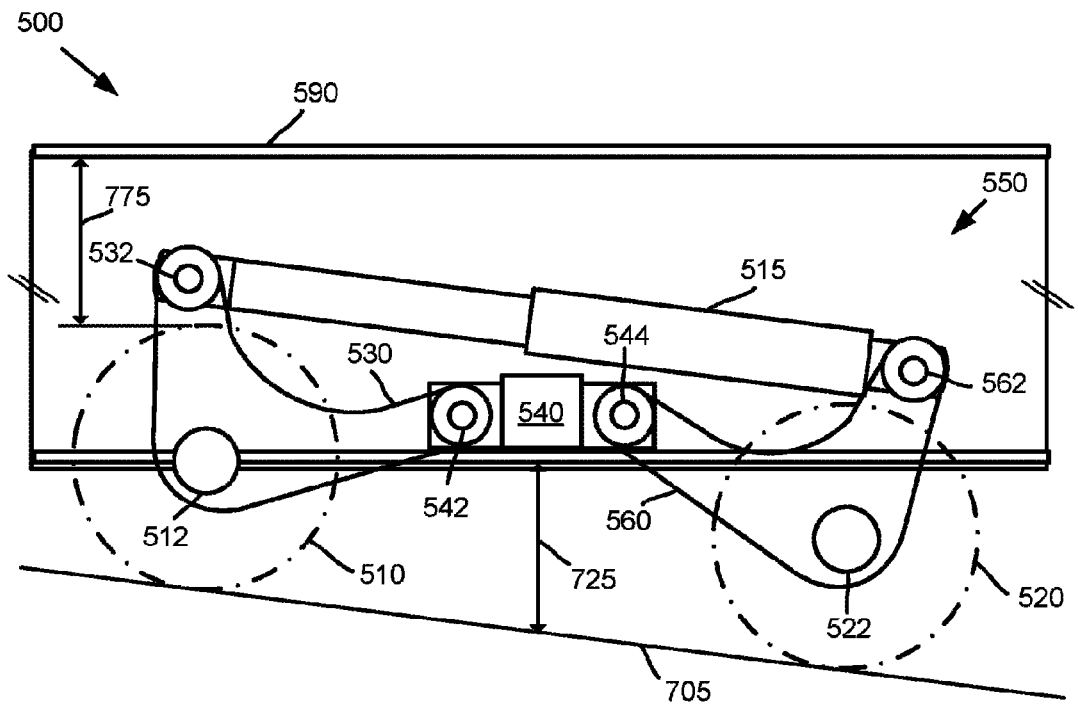
FIG. 7 illustrates the example multi-axle assembly of FIG. 5 on a longitudinally inclined support surface.

FIG. 7 illustrates the example multi-axle assembly 550 of FIG. 5 on a longitudinally inclined support surface 705. Multi-axle assembly 550 may be configured to provide sufficient wheel clearance 775 to accommodate the rotation or articulation of first axle assembly 510 about first articulation connection 542. Similarly, multi-axle assembly 550 may be configured to provide a sufficient wheel clearance to accommodate the articulation of second axle assembly 520 about second articulation connection 544. A maximum amount of articulation associated with multi-axle assembly 550 may correspond to the maximum rated angle of the inclined surface 705 that load transport apparatus 500 is configured to traverse.

The frame clearance 725 associated with the support structure 590 with respect to the transport surface 705 may be determined, at least in part, from the amount of wheel clearance 775 associated with multi-axle assembly 550, whether the transport surface is inclined, as shown in FIG. 7, or generally level, as shown in FIG. 5. The angle of slope associated with inclined surface 705 may also determine the frame clearance 725, such that the frame clearance 725 may vary significantly between the front and back ends of the support structure 590.

Multi-axle assembly 550 may be configured to maintain the same frame clearance 725 of the portion of frame structure 590 located below the approximate midpoint of multi-axle assembly 550, regardless of whether the transport surface is inclined or level. For example, the frame clearance 725 illustrated in FIG. 7 may be approximately the same as frame clearance 525 illustrated in FIG. 5. Additionally, suspension system 515 may be configured to equalize the load over multi-axle assembly 550 by transferring forces between the first and second axle assemblies 510, 520.

Figure 8:
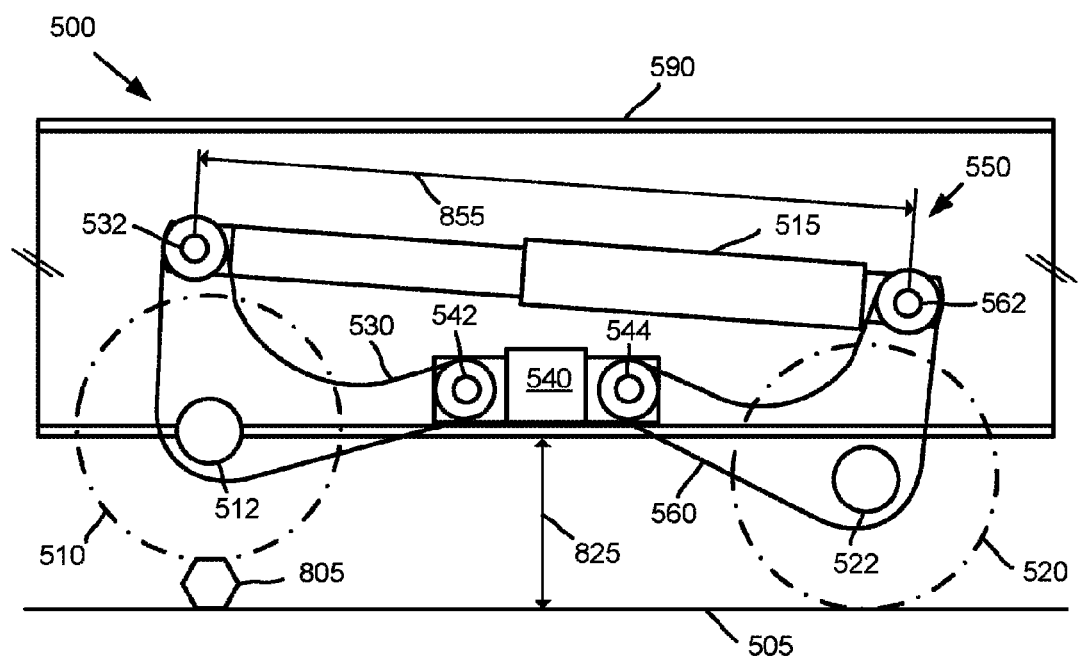
FIG. 8 illustrates the example multi-axle assembly of FIG. 5 travelling on rough terrain.

FIG. 8 illustrates the example multi-axle assembly of FIG. 5 travelling or otherwise positioned on rough terrain 805. The rough terrain 805 may comprise a rock, a hole, mud, soft ground, a tree, other types of obstacles, or any combination thereof.

While first axle assembly 510 traverses the rough terrain 805 and articulates about articulation connection 542, the rotational position of second axle assembly 520 may remain substantially the same. For example, multi-axle assembly 550 may be configured such that second axle assembly 520 does not articulate when first axle assembly 510 traverses the rough terrain 805.

In some examples, second axle assembly 520 may be configured to articulate by a different amount of rotational angle as compared to first axle assembly 510. Additionally, second axle assembly 520 may be configured to articulate by a different angular rate of rotation as compared to first axle assembly 510.

Suspension system 515 may be configured to control, vary, or otherwise adjust the distance 855 between first and second connections 532, 562 according to the amount of articulation of first axle assembly 510 as the wheel traverses the rough terrain 805. For example, the distance 855 shown in FIG. 8 may be less than the distance 555 shown in FIG. 5.

Additionally, multi-axle assembly 550 may be configured to maintain approximately the same frame clearance 825 of the support structure 590 regardless of whether the transport apparatus 500 is traveling over a level surface or over rough terrain, according to the relative amounts of articulation of first axle assembly 510 and/or second axle assembly 520. For example, the frame clearance 825 illustrated in FIG. 8 may be approximately the same as frame clearance 525 illustrated in FIG. 5.

In some examples, suspension system 515 may be configured to absorb an amount of compressive force and/or provide shock absorption in response to first axle assembly 510 articulating when the wheel comes into contact or traverses the rough terrain 805. The amount of stroke of suspension system 515 may determine, in part, the amount of shock absorption that is provided.

Multi-axle assembly 550 may be configured to maintain approximately the same load on each of the first axle assembly 510 and the second axle assembly 520, whether the transport apparatus 500 is being operated on rough terrain 805, such as illustrated in FIG. 8, on an inclined support surface 705, as illustrated in FIG. 7, or on a substantially even surface 505, as illustrated in FIG. 5.

The load bearing frame of support structure 590 may be supported by first and second axles 512, 522 in a generally horizontal orientation above transport surface 505 by frame clearance 825. In some examples, frame clearance 825 may not substantially change in response to the articulation of first articulation structure 530 while the load bearing frame continues to be supported by first and second axles 512, 522 in the generally horizontal orientation Suspension system 515 may comprise a single lift cylinder having a first end and a second end. The first end of the lift cylinder may be rotationally coupled to first articulation structure 530 at first connection 532, and the second end of the lift cylinder may be rotationally coupled to second articulation structure 560 at second connection 562. The lift cylinder may be configured to rotate with respect to both first connection 532 and second connection 562 in response to the articulation of first articulation structure 530 about first articulation connection 542. Additionally, the lift cylinder may be configured to rotate about second connection 562 without any articulation of second articulation structure 560 about second articulation connection 544. The lift cylinder may not be connected to the frame of support structure 590 or any other structure other than first and second articulation structures 530, 560.

Figure 9A:
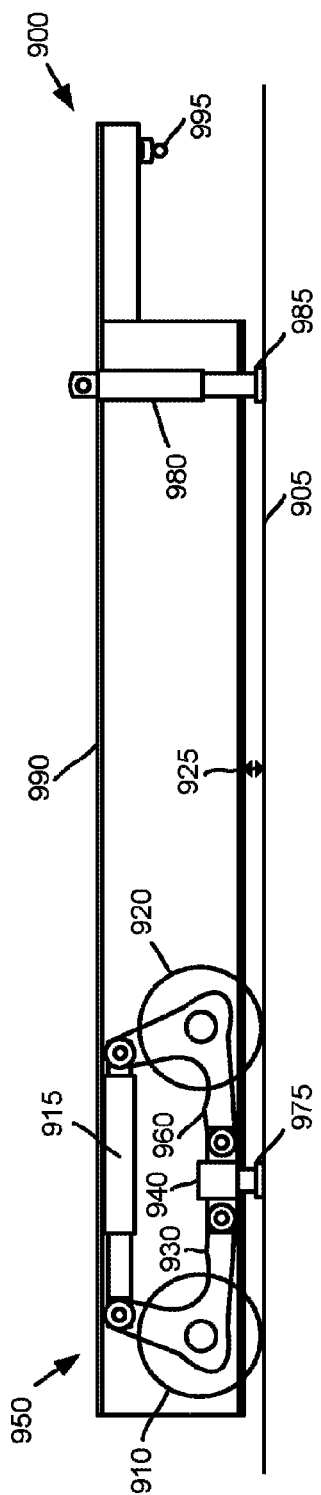
FIG. 9A illustrates a side view of an example load transport apparatus with a multi-axle assembly.

FIG. 9A illustrates a side view of an example load transport apparatus 900 with a multi-axle assembly 950. Load transport apparatus 900 may comprise a support structure 990 with a trailer hitch 995 or king pin. In some examples, trailer hitch 995 may be configured to operably couple the load transport apparatus 900 to a tractor, a semi-truck, a loading dividing jeep, or other types of hauling vehicles during a transport operation.

Support structure 990 may be supported by one or more landing gear 985. The landing gear 985 may comprise a hydraulic cylinder 980. Hydraulic cylinder 980 may be configured to raise or lower the support frame 990, such as during the coupling or uncoupling of the load transport apparatus 900 to a hauling vehicle.

Multi-axle assembly 950 may be configured to be placed in a retracted position similar to multi-axis assembly 550 illustrated in FIG. 6. With multi-axle assembly 950 placed in the retracted position, the support structure 990 may be lowered to a relatively low frame clearance 925. In some examples, the support structure 990 may be lowered onto a second landing gear 975 located below multi-axis assembly 950. In still other examples, second landing gear 975 may comprise a hydraulic cylinder, similar to that describe above for landing gear 985. Second landing gear 975 may be attached below and/or to an axle mount 940.

One or more wheels associated with a first axle assembly 910 and a second axle assembly 920 may be configured to support the load bearing frame 990 on a transport surface 905. Suspension system 915 may be configured to articulate both of first axle assembly 910 and second axle assembly 920 from an extended position to the retracted position, in which at least a portion of the wheels may be withdrawn into the load bearing frame 990. One or both of first and second axle assemblies 910, 920 may comprise an articulation structure, such as a first articulation structure 930 and a second articulation structure 960. The frame clearance 925 may decrease in response to the wheels being withdrawn. Additionally, at least a portion of the load associated with load bearing frame 990 may be transferred from the wheels to second landing gear 975 in response to the wheels being withdrawn.

Landing gear 985 may comprise a walking system configure to move load transport apparatus 900 relatively short distances, for example between two well heads located in an oil field. In some examples, the load transport apparatus 900 may be configured to walk with multi-axle assembly 950 located in the retracted position or the extended position. Additionally, load transport apparatus 900 may be configured to operate as a drilling platform with multi-axle assembly 950 located in the retracted position. On the other hand, load transport apparatus 900 may be configured to be moved by a hauling vehicle over relatively long distances, such as on the freeway, with multi-axle assembly 950 located in an extended position, similar to multi-axle assembly 550 illustrated in FIG. 5.

Figure 9B:
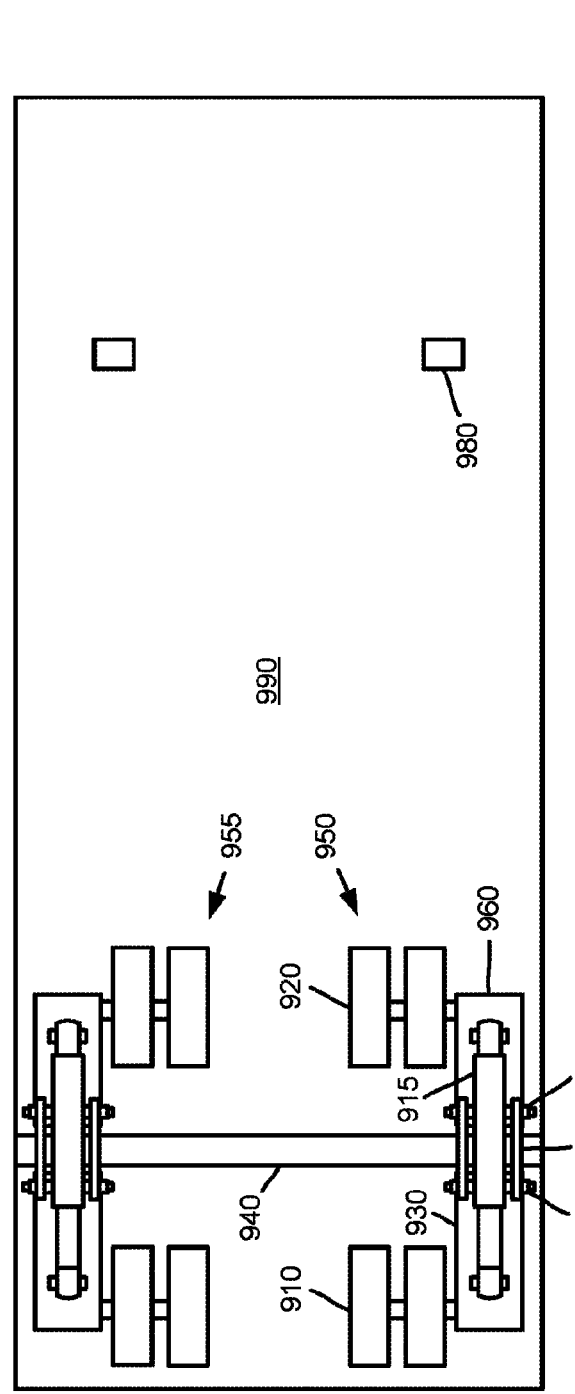
FIG. 9B illustrates a plan view of the load transport apparatus of FIG. 9A.

FIG. 9B illustrates a plan view of the load transport apparatus 900 of FIG. 9A. In addition to multi-axle assembly 950, a second multi-axle assembly 955 may be located on an opposite side of support structure 990. Multi-axle assembly 950 may be operably coupled to support structure 990 via axle mount 940. Axle mount 940 may comprise a first articulation connection 942 and a second articulation connection 944. First articulation connection 942 and second articulation connections 944 may be offset or spaced apart from each other, and may be located on an axle attachment 945 that may comprise one or more metal plates welded or otherwise attached to axle mount 940.

In the example load transport apparatus 900 illustrated in FIG. 9B, first axle assembly 910 and second axle assembly 920 are shown as being located inboard of first articulation structure 930 and second articulation structure 960, respectively. Although first axle assembly 910 and second axle assembly 920 are illustrated as including two wheels, in some examples, each axle assembly may comprise four or more wheels, similar to first axle assembly 110 and second axle assembly 120 of FIG. 1. The four or more wheels may share a common axis, with two wheels located on both sides of the axle mount.

Figure 9C:
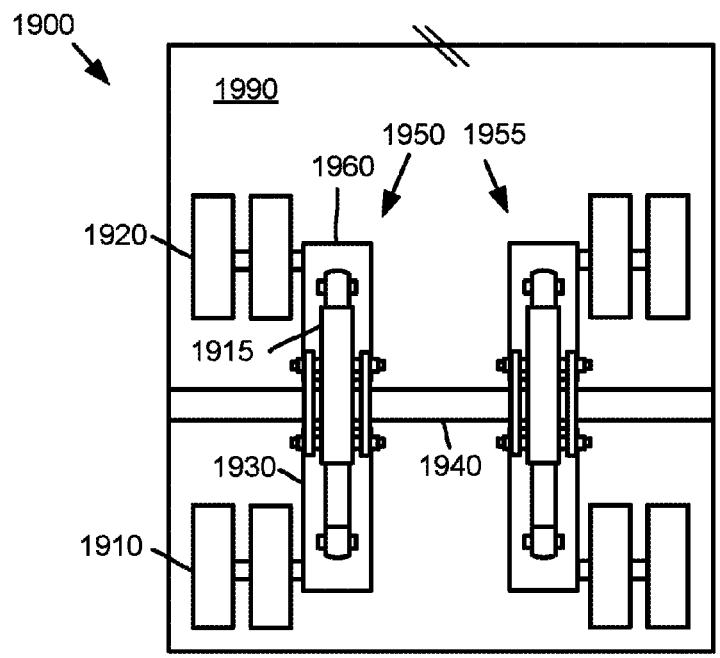
FIG. 9C illustrates a partial plan view of another example load transport apparatus.

FIG. 9C illustrates a partial plan view of another example load transport apparatus 1900 comprising a first multi-axle assembly 1950 and a second multi-axle assembly 1955. First and second multi-axle assemblies 1950, 1955 may be operably coupled to a support structure 1990 via an axle mount 1940. First multi-axle assembly 1950 may comprise a first axle assembly 1910 and a second axle assembly 1920. First axle assembly 1910 and second axle assembly 1920 are shown as being located outboard of a first articulation structure 1930 and a second articulation structure 1960, respectively. Additionally, a suspension system 1915 may be configured to articulate both of first axle assembly 1910 and second axle assembly 1920 from an extended position to the retracted position, or from a retracted position to an extended position.

In some examples, the wheel configuration associated with load transport apparatus 1900 may provide a larger effective tread width as compared to a load transport apparatus with the wheel located inboard of the articulation structures. A larger tread width with may provide increased lateral stability of support structure 1990 and the associated load.

Figure 9D:
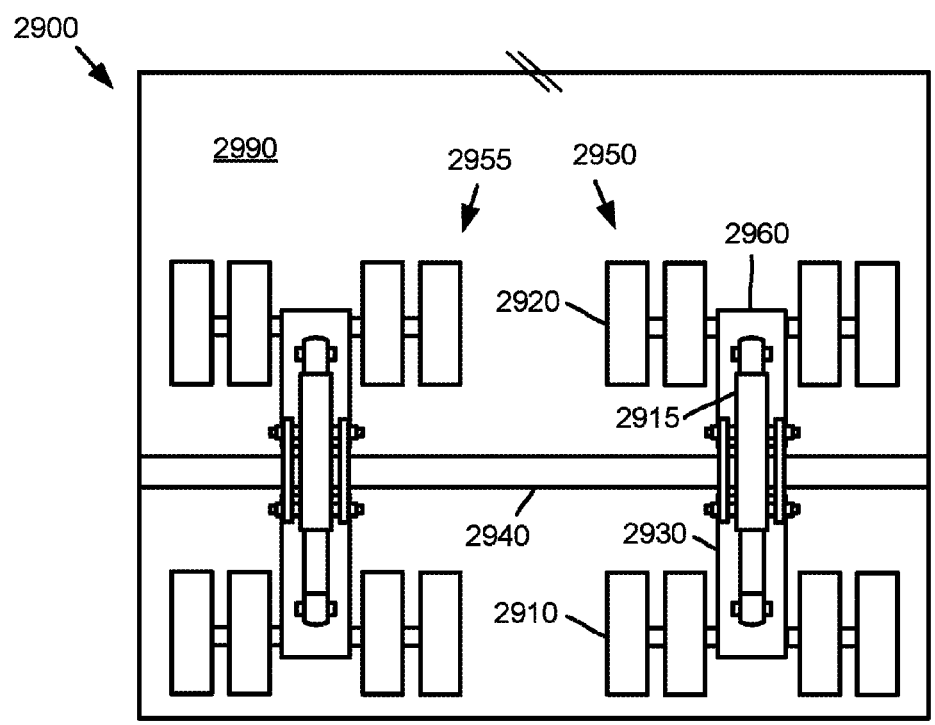
FIG. 9D illustrates a partial plan view of yet another example load transport apparatus.

FIG. 9D illustrates a partial plan view of yet another example load transport apparatus 2900 comprising a first multi-axle assembly 2950 and a second multi-axle assembly 2955. First and second multi-axle assemblies 2950, 2955 may be operably coupled to a support structure 2990 via an axle mount 2940. First multi-axle assembly 2950 may comprise a first axle assembly 2910 and a second axle assembly 2920. First axle assembly 2910 and second axle assembly 2920 are shown as comprising a number of wheels located both inboard and outboard of a first articulation structure 2930 and a second articulation structure 2960, respectively. A suspension system 2915 may be configured to articulate both of first axle assembly 2910 and second axle assembly 2920 from an extended position to the retracted position, or from a retracted position to an extended position.

By locating wheels on either side of first articulation structure 2930 and second articulation structure 2960, the weight of the support structure 2990 and/or load may be distributed to a larger number of wheels, thus providing less loading per wheel. Additionally, the wheel configuration may more evenly distribute the load for any one axle assembly, as at least a portion of the weight may be supported by both the left and right side wheels of the axle assembly. In some examples, first multi-axle assembly 2950 and second multi-axle assembly 2955 may be configured to retract and extend relative to the support frame 1990, and to articulate, rotate, and/or pivot with respect to axle mount 2940 or the first and second articulation structures 2930, 2960.

Figure 10:
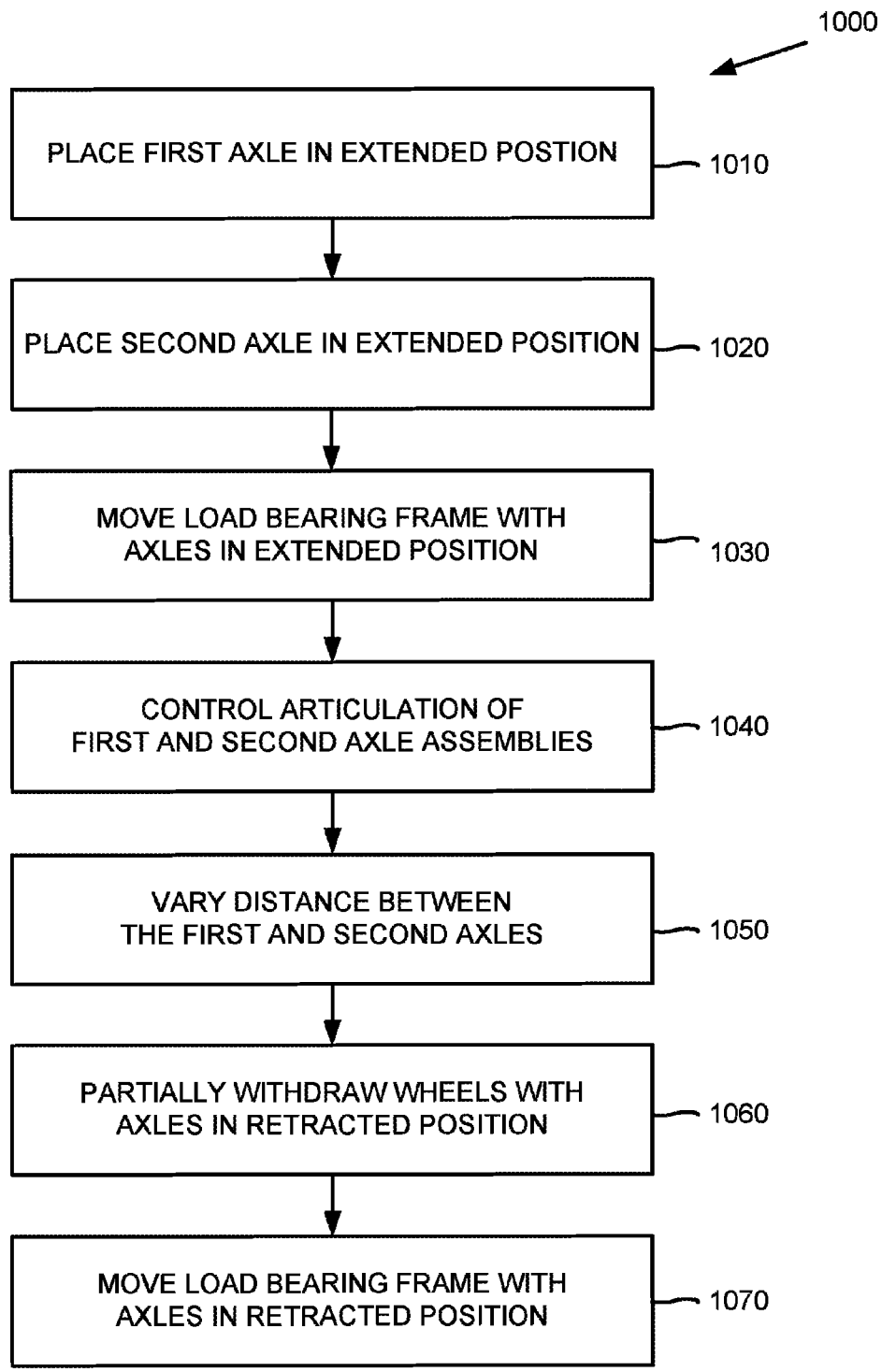
FIG. 10 illustrates an example process of transporting a load bearing frame.

FIG. 10 illustrates an example process 1000 of transporting a load bearing frame. At operation 1010, a first axle may be placed in an extended position. The first axle may be operably coupled to an axle mount of the load bearing frame by a first articulation structure.

At operation 1020, a second axle may be placed in an extended position. The second axle may be spaced a distance from the first axle and may be operably coupled to the axle mount by a second articulation structure. Additionally, the second articulation structure may be operably coupled to the first articulation structure by a suspension system.

In some examples, the first articulation structure may be rotationally coupled to the axle mount by a first articulation connection, and the second articulation structure may be rotationally coupled to the axle mount by a second articulation connection. The first articulation connection may be spaced apart from the second articulation connection along the length of the load bearing frame.

At operation 1030, the load bearing frame may be moved in a first transport mode in which one or more wheels may be configured to support the load bearing frame on a transport surface with the first axle and the second axle placed in the extended position. The load bearing frame may be supported above the transport surface by a frame clearance.

At operation 1040, an amount of articulation of the first articulation structure and the second articulation structure may be controlled by the suspension system. The suspension system may be configured to vary the distance between the first axle and the second axle as a function of amount of articulation. In some examples, the amount of articulation may be controlled by articulating the first articulation structure about the first articulation connection by a different of amount of articulation as compared to the articulation of the second articulation structure about the second articulation connection.

The suspension system may comprise a single lift cylinder having a first end and a second end. The lift cylinder may be placed in a generally horizontal orientation. The first end may be rotationally coupled to the first articulation structure at a first connection, and the second end may be rotationally coupled to the second articulation structure at a second connection. In some examples, the amount of articulation may be controlled by rotating the lift cylinder with respect to the first connection and the second connection. The lift cylinder may be rotated in response to the articulation of the first articulation structure about the first articulation connection when the load bearing frame is moving in the first transport mode. In some examples, the lift cylinder may be rotated with respect to both the first connection and the second connection without any articulation of the second articulation structure about the second articulation connection.

The load bearing frame may be supported by the first and second axles in a generally horizontal orientation above the transport surface. In some examples, the frame clearance may not change in response to the articulation of the first articulation structure while the load bearing frame continues to be supported by the first and second axles in the generally horizontal orientation.

At operation 1050, the distance between and/or the respective vertical positions of the first axle and the second axle may be varied based, at least in part, on the amount of articulation of the first articulation structure and the second articulation structure.

The first and second articulation structures may be controlled to allow for different amounts of articulation of the first and second axles. First and second axles may be configured to articulate in the same rotational orientation (i.e., both either clockwise or counterclockwise. Alternatively, the first axle may be configured to articulate in the clockwise direction while the second axle articulates in the counterclockwise direction.

A substantially rigid connection may be formed between the first articulation structure and the second articulation structure. For example, a hydraulically actuated cylinder coupled between the first articulation structure and the second articulation structure may be locked at a fixed length. In response to an upward articulation of the first articulation structure towards the load bearing frame, the substantially rigid connection causes the second articulation structure to articulate down and away from the load bearing frame.

At operation 1060, at least a portion of the wheels may be withdrawn into the load bearing frame by articulating the first articulation structure and the second articulation structure to place both the first axle and the second axle in a retracted position. The frame clearance may decrease in response to withdrawing the portion of the wheels.

At operation 1070, the load bearing frame may be moved in a second transport mode in which the first axle and the second axle are placed in the retracted position.

Figure 11:
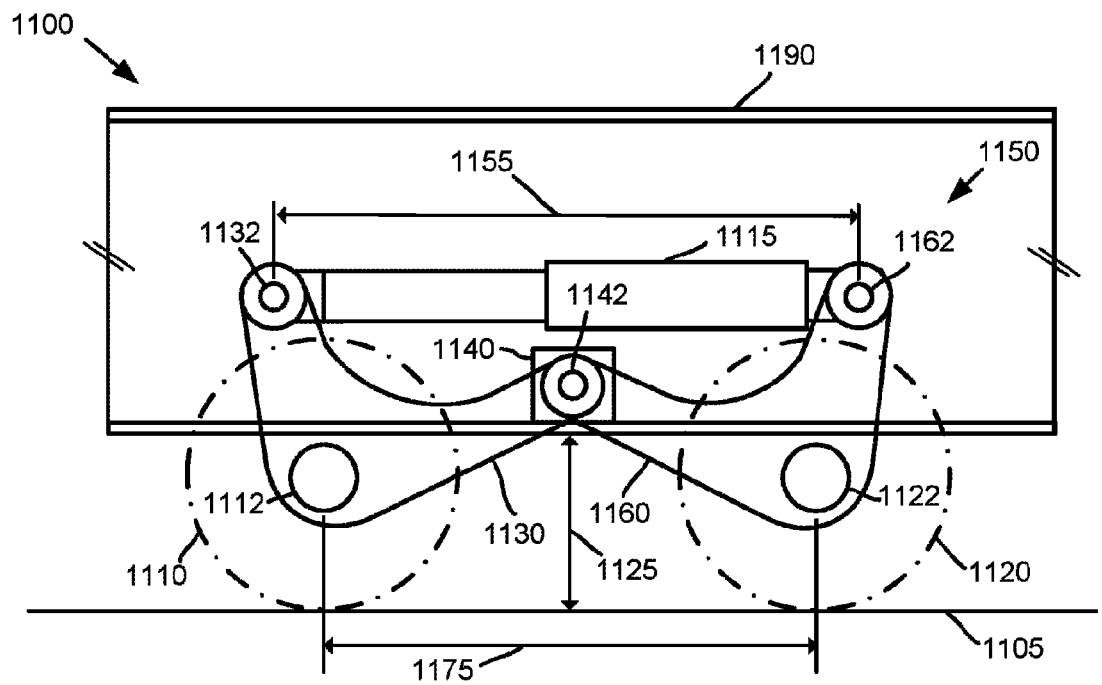
FIG. 11 illustrates an example system comprising a multi-axle assembly.

FIG. 11 illustrates an example system 1100 comprising a multi-axle assembly 1150. The multi-axle assembly 1150 may comprise a first axle assembly 1110 and a second axle assembly 1120. First axle assembly 1110 may comprise one or more wheels (shown in dashed lines) mounted on a first axle 1112. Similarly, second axle assembly 1120 may comprise one or more wheels (shown in dashed lines) mounted on a second axle 1122.

Multi-axle assembly 1150 may be operably coupled to a support structure 1190 via an axle mount 1140. In some examples, axle mount 1140 may be welded or otherwise attached to a structural frame of support structure 1190. Axle mount 1140 may comprise a common articulation connection 1142 for first axle assembly 1110 and second axle assembly 1120.

A first articulation structure 1130 may be configured to operably couple first axle assembly 1110 to axle mount 1140, so that first axle 1112 may articulate about common articulation connection 1142. Additionally, a second articulation structure 1160 may be configured to operably couple second axle assembly 1120 to axle mount 1140, so that second axle 1122 may articulate about common articulation connection 1142. Common articulation connection 1142 may therefore provide the same pivot point for the first and second axle assemblies 1110, 1120, respectively, of multi-axle assembly 1150. First and second articulation structures 1130, 1160 may comprise substantially rigid metal plates.

First axle assembly 1110 and second axle assembly 1120 may be configured to pivot or articulate about common articulation connection 1142. Common articulation connection 1142 may be configured to provide a rotational axis for pivoting and/or articulating first and second axle assemblies 1110, 1120. The rotational axis may be substantially parallel to the axes of rotation of first and second axles 1110, 1120.

First articulation structure 1130 may be operably coupled to second articulation structure 1160 by a suspension system 1115. First articulation structure 1130 may be rotationally coupled to suspension system 1115 at a first connection 1132. Similarly, second articulation structure 1160 may be rotationally coupled to suspension system 1115 at a second connection 1162. The first and second connections 1132, 1162 may be located at either end of suspension system 1115. Suspension system 1115 may comprise a hydraulic cylinder, a pneumatic cylinder, a motor-driven push rod, and other types of suspension devices including gears and linkage, or any combination thereof. For example, suspension system 1115 may comprise a lift cylinder oriented in a generally horizontal position within the structural frame of support structure 1190.

Suspension system 1115 may be configured to control the articulation of one or both of first axle assembly 1110 and second axle assembly 1120 about common articulation connection 1142. Additionally, suspension system 1115 may be configured to maintain and/or control an amount of frame clearance 1125 associated with the support structure 1190 with respect to a transport surface 1105. In some examples, multi-axle assembly 1150 may be understood as being located in a generally extended position in FIG. 11.

Suspension system 1115 may be configured to control, vary, or otherwise adjust a distance 1155 between first and second connections 1132, 1162 according to the amount of articulation of one or both of first axle assembly 1110 and second axle assembly 1120. In some examples, suspension system 1115 may be configured to extend and/or retract to vary the distance 1155, such as through the actuation of a lift cylinder. Varying the distance 1155 between first and second connections 1132, 1162 may also operate to vary the distance 1175 between first and second axles 1112, 1122 as one or both of first axle assembly 1110 and second axle assembly 1120 articulate.

In some examples, suspension system 1115 may be configured to maintain or fix the distance 1155 between first and second connections 1132, 1162, such that suspension system 1115 may form a substantially rigid body. For example, suspension system 1115 may be locked as a rigid body after multi-axle assembly 1150 has been placed in the extended position or in a retracted position.

In other examples and/or modes of operation, multi-axle assembly 1150 may be configured to retract some or all of the wheels associated with first axle assembly 1110 and/or second axle assembly 1120 into the structural frame of support structure 1190, similar to one or more of the example configurations of multi-axle assembly 550 illustrated in FIGS. 6-8 or multi-axle assembly 950 illustrated in FIGS. 9A and 9B. However, instead of having two, spaced apart articulation connections, multi-axle assembly 1150 may be configured to articulate first axle assembly 1110 and second axle assembly 1120 about the common articulation connection 1142.

Multi-axle assembly 1150 may be configured to articulate first axle assembly 1110 and second axle assembly 1120 in unison, independently from each other, or separately from each other. For example, second axle assembly 1120 may be configured to articulate by the same or by a different amount of rotational angle as compared to first axle assembly 1110. Additionally, second axle assembly 1120 may be configured to articulate by the same or by a different angular rate of rotation as compared to first axle assembly 1110.

Multi-axle assembly 1150 may be configured to maintain approximately the same load on each of the first axle assembly 1110 and the second axle assembly 1120, whether the transport apparatus 1100 is being operated on rough terrain, on an inclined support surface, or on a substantially even surface.

Figure 12:
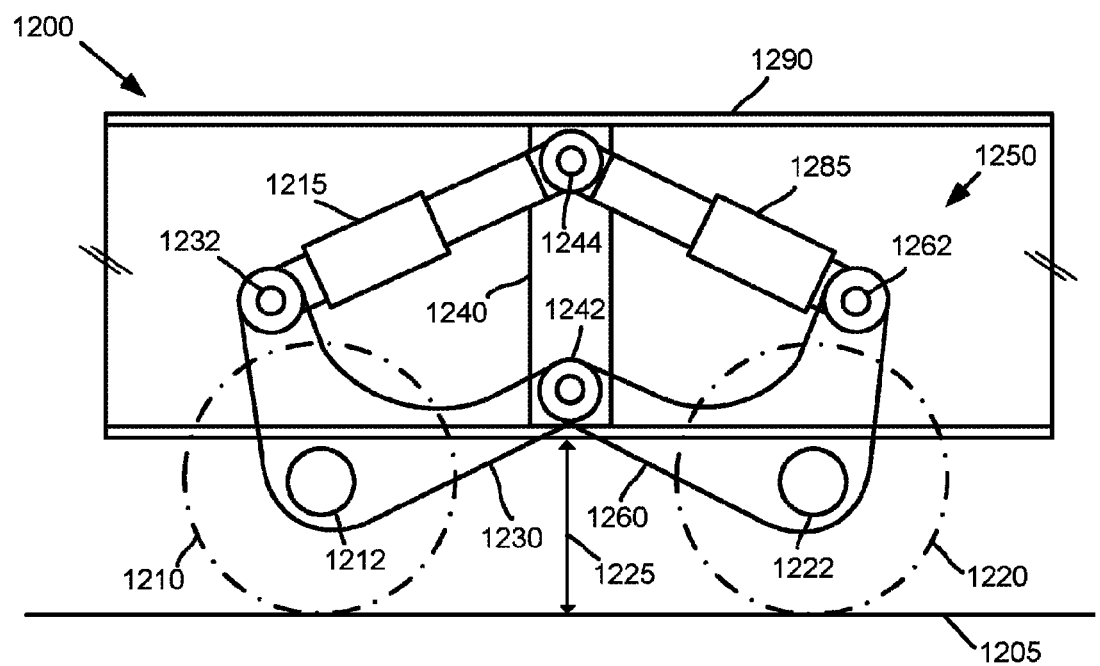
FIG. 12 illustrates another example system comprising a multi-axle assembly.

FIG. 12 illustrates another example system 1200 comprising a multi-axle assembly 1250. The multi-axle assembly 1250 may be configured similarly as multi-axle assembly 1150 of FIG. 11. A first axle assembly 1210 and a second axle assembly 1220 may be operably coupled to a support structure 1290 via an axle mount 1240 comprising a common articulation connection 1242. In other examples, axle mount 1240 may comprise separate articulation connections. Additionally, a first articulation structure 1230 may be configured to operably couple first axle assembly 1210 to axle mount 1240, and a second articulation structure 1260 may be configured to operably couple second axle assembly 1220 to axle mount 1240.

A suspension system associated with multi-axle assembly 1250 may comprise a first suspension apparatus 1215 and a second suspension apparatus 1285. First suspension apparatus 1215 may be configured to control the articulation of first axle assembly 1210 and second suspension apparatus 1285 may be configured to control the articulation of second axle assembly 1120 about common articulation connection 1242. Additionally, the suspension system may be configured to maintain and/or control an amount of frame clearance 1225 associated with the support structure 1290 with respect to a transport surface 1205.

First suspension apparatus 1215 and second suspension apparatus 1285 may be operably coupled to axle mount 1240 via a connection 1244. Connection 1244 may be configured to provide a rotational axis about which one or both of first suspension apparatus 1215 and second suspension apparatus 1285 may rotate. First suspension apparatus 1215 and second suspension apparatus 1285 may be configured to extend and/or retract as one or both of first axle assembly 1210 and second axle assembly 1220 articulate. In some examples, the system 1200 may be configured to maintain or create a substantially rigid frame between connections 1232, 1262, 1242, and 1244.

In other examples and/or modes of operation, multi-axle assembly 1250 may be configured to retract some or all of the wheels associated with first axle assembly 1210 and/or second axle assembly 1220 into the structural frame of support structure 1290, similar to one or more of the example configurations of multi-axle assembly 550 illustrated in FIGS. 6-8 or multi-axle assembly 950 illustrated in FIGS. 9A and 9B.

Additionally, multi-axle assembly 1250 may be configured to articulate first axle assembly 1210 and second axle assembly 1220 in unison, independently from each other, or separately from each other. For example, second axle assembly 1220 may be configured to articulate by the same or by a different amount of rotational angle as compared to first axle assembly 1210. Additionally, second axle assembly 1220 may be configured to articulate by the same or by a different angular rate of rotation as compared to first axle assembly 1210. Multi-axle assembly 1250 may be configured to maintain approximately the same load on each of the first axle assembly 1210 and the second axle assembly 1220, whether the transport apparatus 1200 is being operated on rough terrain, on an inclined support surface, or on a substantially even surface.

Figure 13:
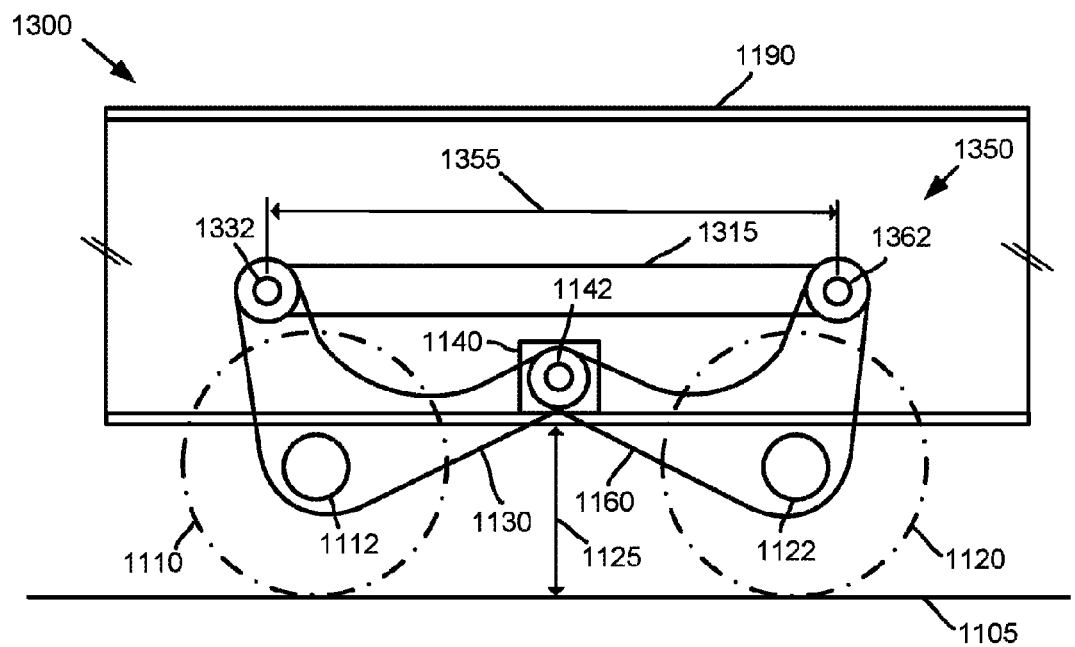
FIG. 13 illustrates yet another example system comprising a multi-axle assembly.

FIG. 13 illustrates yet another example system 1300 comprising a multi-axle assembly 1350. System 1300 may be configured similarly as system 1100 of FIG. 11, except that suspension system 1115 has been replaced with a suspension system 1315. Suspension system 1315 may be configured to maintain and/or control the amount of frame clearance 1125 associated with the support structure 1190 with respect to transport surface 1105.

Suspension system 1315 may comprise a rigid link or bar operably coupled to first articulation structure 1130 by a first connection 1332. Additionally, the rigid link may be operably coupled to second articulation structure 1160 by a second connection 1362. With the rigid link coupled between first and second articulation structures 1130, 1160, a distance 1355 between first and second connections 1332, 1362 may be fixed to create a rigid multi-axle assembly 1350. The entire substantially rigid multi-axle assembly 1350 may articulate about articulation connection 1142 together with suspension system 1315.

The suspension system 1315 may not be connected or otherwise attached to the frame of support structure 1190. Rather, the suspensions system 1315 may only be attached to first and second articulation structures 1130, 1160, at either end of the rigid link. The rigid link of suspension system 1315 may be located in a generally horizontal orientation with the wheels located on support surface 1105. Suspension system 1315 may be configured to equalize the load over multi-axle assembly 1350 by transferring forces between the first and second axle assemblies 1110, 1120.

Figure 14:
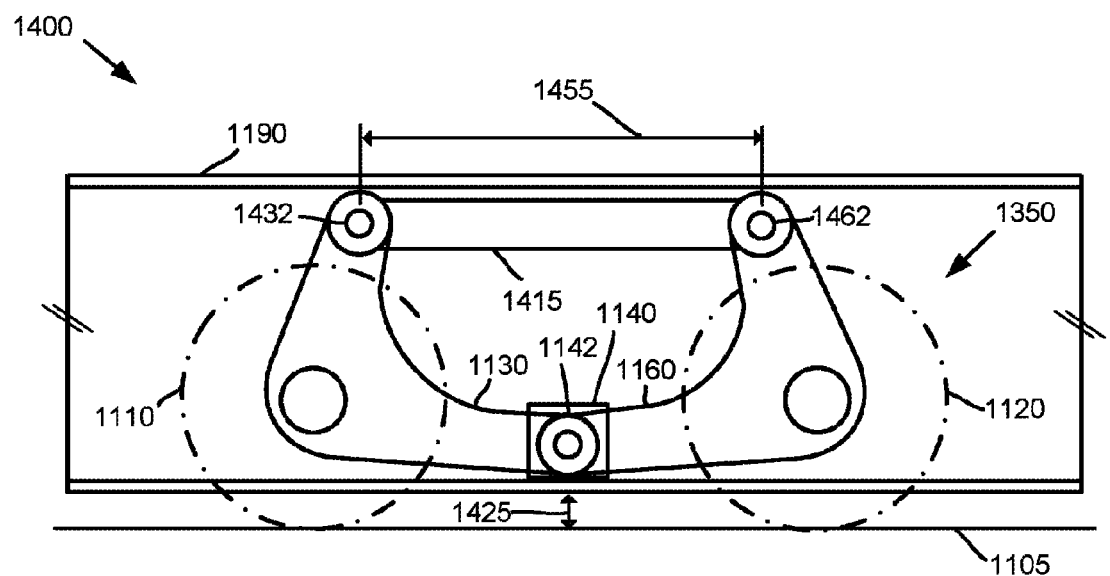
FIG. 14 illustrates an example system comprising the multi-axle assembly of FIG. 13 in a retracted position.

FIG. 14 illustrates an example system 1400 comprising the multi-axle assembly 1350 of FIG. 13 in a retracted position. In some examples, only a lower portion of the wheels associated with multi-axle assembly 1350 may extend below the structural frame to provide a reduced frame clearance 1425.

In transitioning multi-axle assembly 1350 between the extended position illustrated in FIG. 13 and the retracted position illustrated in FIG. 14, multi-axle assembly 1350 may be at least partially disconnected from the linking bar to allow both the first and second axle assemblies 1110, 1120 to rotate up into the frame of support structure 1190. For example, one or both ends of the linking bar may be disconnected at first and second connections 1332, 1362. A jack may be used to support the frame of support structure 1190 when the linking bar is disconnected.

After the linking bar has been disconnected, and first and second articulation structures 1130, 1160 have been rotated up to place multi-axle assembly 1350 in the retracted position, the linking bar may be reconnected at first and second connections 1332, 1362. In some examples, the same linking bar of suspension system 1315 may be reconnected to first and second articulation structures 1130, 1160 such that the distance 1355 between first and second connections 1332, 1362 is the same whether multi-axle assembly 350 is in the retracted position or the extended position.

In other examples, a second linking bar 1415 may be used to operably couple first and second articulation structures 1130, 1160 when multi-axle assembly 1350 is located in the retracted position. The distance 1455 between first and second connections 1432, 1462 may be different than the distance 1355 associated with suspension system 1315 of FIG. 13. For example, the second linking bar 1415 may be shorter than the linking bar associated with suspension system 1315.

Having described and illustrated various examples herein, it should be apparent that other examples may be modified in arrangement and detail. For example, one or more of the examples illustrated as comprising two articulation connections may instead have a common articulation connection for two axle assemblies. Similarly, one or more of the examples illustrated as comprising a common articulation connection for two axle assemblies may instead have two separate articulation connections. We claim all modifications and variations coming within the spirit and scope of the following claims.

The invention claimed is:

1. An axle assembly for transporting a load bearing frame, comprising:
    a first axle operably coupled to an axle mount of the load bearing frame by a first articulation structure, wherein the first articulation structure is rotationally coupled to the axle mount;
    a second axle spaced apart from the first axle and operably coupled to the axle mount by a second articulation structure, wherein the second articulation structure is rotationally coupled to the axle mount; and
    a suspension system operably coupled to both the first articulation structure and the second articulation structure, wherein:
        in a first mode of operation, the suspension system is configured to form a substantially rigid connection between the first articulation structure and the second articulation structure, wherein in response to an upward articulation of the first articulation structure towards the load bearing frame, the substantially rigid connection causes the second articulation structure to articulate down and away from the load bearing frame; and
        in a second mode of operation, the suspension system is configured to articulate both the first articulation structure and the second articulation structure towards the load bearing frame.

2. The axle assembly of claim 1, wherein the first articulation structure is rotationally coupled to the axle mount by a first articulation connection, wherein the second articulation structure is rotationally coupled to the axle mount by a second articulation connection, wherein the first axle is spaced apart from the second axle along a length of the load bearing frame, and wherein the first articulation connection is spaced apart from the second articulation connection along the length of the load bearing frame.

3. The axle assembly of claim 2, wherein the first articulation structure is configured to articulate about the first articulation connection by a different amount of articulation as compared to the second articulation structure about the second articulation connection in the second mode of operation.

4. The axle assembly of claim 1, wherein the suspension system comprises a hydraulic cylinder rotationally coupled to both the first articulation structure and the second articulation structure, and wherein the hydraulic cylinder is configured to retract during the second mode of operation.

5. The axle assembly of claim 4, wherein the hydraulic cylinder is coupled to the first articulation structure and the second articulation structure in a generally horizontal orientation, and wherein the hydraulic cylinder is configured to control an amount of articulation of both the first articulation structure and the second articulation structure while the hydraulic cylinder remains in the generally horizontal orientation.

6. The axle assembly of claim 1, further comprising one or more wheels associated with the first axle and the second axle and configured to support the load bearing frame on a transport surface, wherein during the second mode of operation the suspension system is configured to articulate both of the first articulation structure and the second articulation structure from an extended position, in which the load bearing frame is supported above the transport surface by a frame clearance, to a retracted position, in which at least a portion of the wheels are withdrawn into the load bearing frame, and wherein the frame clearance decreases in response to the wheels being withdrawn.

7. The axle assembly of claim 6, further comprising landing gear operably coupled to the load bearing frame and configured to support a load, wherein at least a portion of the load is transferred from the wheels to the landing gear in response to the wheels being withdrawn.

8. The axle assembly of claim 1, wherein the suspension system comprises a single lift cylinder having a first end and a second end, wherein the first end is rotationally coupled to the first articulation structure at a first connection, and wherein the second end is rotationally coupled to the second articulation structure at a second connection.

9. The axle assembly of claim 8, wherein the lift cylinder is configured to rotate with respect to both the first connection and the second connection in response to the articulation of the first articulation structure, and wherein in a third mode of operation of the suspension system the lift cylinder is configured to rotate about the second connection with minimal articulation of the second articulation structure.

10. The axle assembly of claim 9, wherein the load bearing frame is supported by the first and second axles in a generally horizontal orientation above the transport surface by a frame clearance, and wherein the frame clearance does not substantially change in response to the articulation of the first articulation structure while the load bearing frame continues to be supported by the first and second axles in the generally horizontal orientation.

11. A method of transporting a load bearing frame, comprising:
placing a first axle in an extended position, wherein the first axle is operably coupled to an axle mount of the load bearing frame by a first articulation structure;
placing a second axle in an extended position, wherein the second axle is spaced apart from the first axle and operably coupled to the axle mount by a second articulation structure, and wherein the second articulation structure is operably coupled to the first articulation structure by a suspension system;
forming a substantially rigid connection between the first articulation structure and the second articulation structure when the first axle and the second axle are placed in the extended position, wherein in response to an upward articulation of the first articulation structure towards the load bearing frame, the substantially rigid connection causes the second articulation structure to articulate down and away from the load bearing frame;
moving the load bearing frame in a first transport mode in which one or more wheels associated with the first axle and the second axle that are placed in the extended position are configured to support the load bearing frame on a transport surface, wherein the load bearing frame is supported above the transport surface by a frame clearance;
withdrawing at least a portion of the wheels into the load bearing frame by articulating the first articulation structure and the second articulation structure to place both the first axle and the second axle in a retracted position, wherein the frame clearance decreases in response to withdrawing the portion of the wheels; and
moving the load bearing frame in a second transport mode in which the first axle and the second axle are placed in the retracted position.

12. The method of claim 11, wherein the first articulation structure is rotationally coupled to the axle mount by a first articulation connection, wherein the second articulation structure is rotationally coupled to the axle mount by a second articulation connection, and wherein the first articulation connection is spaced apart from the second articulation connection along the length of the load bearing frame.

13. The method of claim 12, wherein in a third transport mode the first articulation structure articulates about the first articulation connection by a different of amount of articulation as compared to the articulation of the second articulation structure about the second articulation connection.

14. The method of claim 11, wherein the suspension system comprises a lift cylinder having a first end and a second end, wherein the first end is rotationally coupled to the first articulation structure at a first connection, wherein the second end is rotationally coupled to the second articulation structure at a second connection, and wherein the portion of the wheels are withdrawn into the load bearing frame in response to retracting the lift cylinder with respect to the first connection and the second connection.

15. The method of claim 14, wherein the lift cylinder is coupled to both the first articulation structure and the second articulation structure in a generally horizontal orientation.

16. The axle assembly of claim 15, wherein withdrawing the portion of the wheels comprises withdrawing the lift cylinder into the load bearing frame in the generally horizontal orientation.

17. An apparatus for transporting a load bearing frame, comprising:

a first axle operably coupled to an axle mount of the load bearing frame, wherein the first axle is placed in an extended position relative to the load bearing frame;

a second axle operably coupled to the axle mount, wherein the second axle is also placed in the extended position, wherein the first axle and the second axle are configured to support the load bearing frame on a transport surface in the extended position, and wherein the load bearing frame is supported above the transport surface by a frame clearance; and a suspension system controlling an amount of articulation of the first and second axle, wherein in a first mode of operation, in response to an upward articulation of the first axle towards the load bearing frame, the second axle articulates down and away from the load bearing frame, and wherein in a second mode of operation, both the first axle and the second axle articulate towards the load bearing frame.

18. The apparatus of claim 17, wherein the first axle is rotationally coupled to the axle mount by a first articulation connection, wherein the second axle is rotationally coupled to the axle mount by a second articulation connection, and wherein the first articulation connection is spaced apart from the second articulation connection along the length of the load bearing frame.

19. The apparatus of claim 17, wherein the suspension system concurrently articulates both the first axle and the second axle towards the load bearing frame.

20. The apparatus of claim 17, wherein the suspension system comprises a horizontally oriented cylinder operatively coupled to both the first axle and the second axle.

* * * * *